United States Patent [19]

Hengst

[11] 4,329,013
[45] May 11, 1982

[54] BINOCULAR TELESCOPE WITH INTERNAL FOCUSING

[75] Inventor: Alfred Hengst, Wetzlar-Dorlar, Fed. Rep. of Germany

[73] Assignee: Ernst Leitz Wetzlar GmbH, Wetzlar, Fed. Rep. of Germany

[21] Appl. No.: 151,657

[22] Filed: May 20, 1980

[30] Foreign Application Priority Data

May 21, 1979 [DE] Fed. Rep. of Germany ....... 2920583

[51] Int. Cl.³ .......................... G02B 7/06; G02B 7/12; G02B 23/00
[52] U.S. Cl. ........................................ 350/36; 350/47; 350/77
[58] Field of Search .................. 350/36, 46, 47, 74–77

[56] References Cited

U.S. PATENT DOCUMENTS

| 1,324,448 | 12/1919 | Greiner | 350/76 |
| 2,811,895 | 11/1957 | Hensen | 350/36 |
| 4,030,808 | 6/1977 | Hornschu et al. | 350/47 |
| 4,080,042 | 3/1978 | Hornschu et al. | 350/36 |
| 4,087,153 | 5/1978 | Hengst | 350/36 |

FOREIGN PATENT DOCUMENTS

| 2365652 | 11/1975 | Fed. Rep. of Germany | 350/77 |
| 2841611 | 4/1979 | Fed. Rep. of Germany | 350/36 |
| 2841610 | 9/1979 | Fed. Rep. of Germany | 350/36 |

Primary Examiner—Jon W. Henry
Attorney, Agent, or Firm—Schwartz, Jeffery, Schwaab, Mack, Blumenthal & Koch

[57] ABSTRACT

Disclosed is a binocular telescope with internal focusing, comprising two telescope tubes, each having an ocular end and an objective end; a double joint bridge connecting the two telescope tubes; a central focusing element rotatably connected to the bridge; an internal focusing mechanism located in at least a first of the telescope tubes and including a first focusing lens axially movable within the first tube; a mechanism for transforming rotational movement of the central focusing element into axial adjustment of the focusing lens; and a mechanism including an annular bushing rotatably mounted near the objective end of the first telescope tube for independently varying the axial position of the first focusing lens, in order to make diopter focusing adjustments.

9 Claims, 1 Drawing Figure

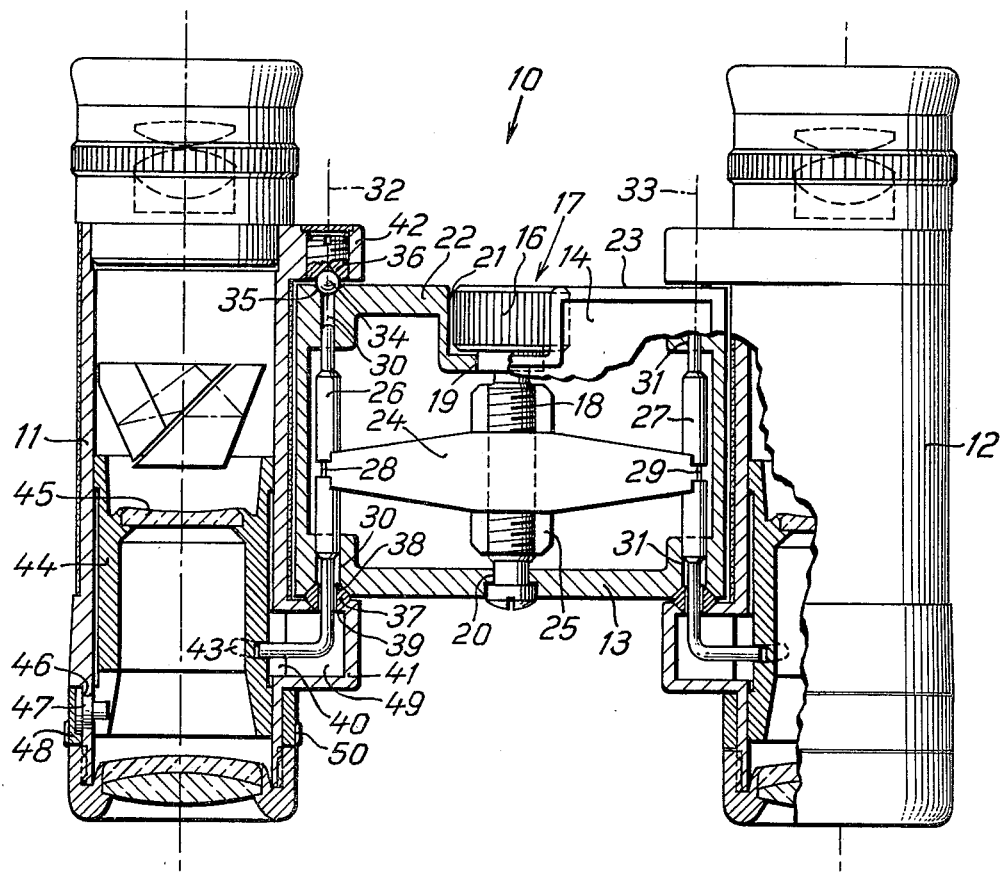

BINOCULAR TELESCOPE WITH INTERNAL FOCUSING

BACKGROUND OF THE INVENTION

The present invention relates to a binocular telescope with internal focusing, which is equipped with a hollow, double joint bridge which connects the two tubes. The bridge includes a spindle of a focusing element and control elements between the focusing element and the focusing means of the telescope, with the latter being housed in sleeves within the tubes.

Binocular telescopes with internal focusing of this type are generally known. Thus, German DE-OS No. 24 24 792 describes a binocular telescope having a central focusing element which, upon actuation for the purpose of focusing, rotates a spindle provided with threads. The spindle in turn moves a stirrup resting under tension against it, and the ends of the stirrup are coupled with transmission rods. These rods cooperate with the focusing elements, with which they are drivingly interconnected. The adjustment of only one optical system to equalize visual differences between the eyes of a user, the so-called diopter focusing adjustment, is not described in this prior art arrangement. It obviously takes place in the conventional manner, by rotation of a ring located in the ocular, which for the purpose of this adjustment requires special adjusting means, such as worm drives or the like. Because the actual sharp focusing of the binocular telescope is effected by means of an adjusting knob located centrally between the two tubes, whereas the diopter focusing adjustment to equalize differences in visual resolution is accomplished by an ocular ring, actual handling of the binoculars becomes cumbersome. In particular, in the case of persons wearing eyeglasses, touching and thus soiling of the glasses by the fingers due to ocular adjustments frequently cannot be prevented. Furthermore, under certain conditions the presence of a drive on the side of the eyepiece may have detrimental effects on the size and configuration of the binoculars.

A binocular telescope is known from German Pat. No. 22 33 055, in which focusing is accomplished by a focusing lens arranged between the ocular and the objective, which is held in an axially displaceable mounting. No diopter focusing adjustment is possible with this telescope.

Another double telescope with internal focusing is described in German DE-OS No. 23 65 652, in which an ocular lens system is axially displaceable forward and backward for the equalization of visual resolution. During rotation of an external tube of the ocular system of lenses, the distance between the external ocular lens and the inner lens system, and thus the magnification of the image, is not altered and the quality of the image not affected.

Aside from the fact that there is no longer any genuine internal focusing present in this arrangement, the danger of soiling a user's eyeglasses is again present as the result of the diopter focusing adjustment on the ocular side. Furthermore, with the larger eyepiece lenses of telescopes designed for the wearers of eyeglasses, there is frequently not enough space left for the installation of a worm drive on the ocular side.

SUMMARY OF THE INVENTION

It is therefore an object of the present invention to provide an improved binocular telescope of the above-described type.

It is a particular object of the invention to provide an improved binocular telescope having improved handling capabilities in regard to diopter focusing adjustments, especially in the case of observation through eyeglasses, and also one which is equipped with genuine internal focusing.

In accomplishing the foregoing objects, there has been provided according to the present invention a binocular telescope with internal focusing comprising two telescope tubes, each having an ocular end and an objective end; a double joint bridge connecting the two telescope tubes; a central focusing element rotatably connected to the bridge; means, located in at least a first of the telescope tubes and including a first focusing lens axially movable within the first tube, for internally focusing the telescope; means for transforming rotational movement of the central focusing element into axial adjustment of the focusing lens; and means, including an annular bushing rotatably mounted near the objective end of the first telescope tube, for independently varying the axial position of the first lens, in order to make diopter focusing adjustments.

Preferably, the internal focusing means includes a first sleeve axially movable inside of the first telescope tube for holding the first focusing lens, and the movement transforming means comprises a threaded spindle rotatable with the central focusing element, a stirrup member having a threaded portion resiliently biased against the threaded spindle and at least a first arm, and a first axially movable control element engaged by the first stirrup arm and operatively engaging the first sleeve. In a preferred form of the diopter focusing means, the first sleeve includes a helical groove in the outer surface thereof and the control element engages the first sleeve in this groove, and the first sleeve further includes a recess extending in a direction parallel to the axis of the first telescope tube and the annular bushing includes a pin member on its inner surface engaging in the recess. Thus, rotation of the bushing causes rotation of the first sleeve to independently vary the axial position of the first focusing lens.

Further objects, features and advantages of the present invention will become apparent from the detailed description of preferred embodiments which follows when considered together with the attached figure of drawing.

BRIEF DESCRIPTION OF THE DRAWING

The FIGURE of drawing is a schematic plan view of a pair of binoculars according to the invention, these being shown partly in section and partly broken away for clarity.

DETAILED DESCRIPTION OF PREFERRED EMBODIMENTS

According to the invention, means are provided for changing the spatial position of the focusing means in at least one of the tubes. These changing means are actuated by the rotation of an annular bushing mounted on the objective side on this tube. A particularly simple and cost effective solution is obtained by equipping one of the internal sleeves holding the focusing lens with a helical groove to be engaged by one of the control elements actuated by the central focusing element and by providing the sleeve with a limited recess defined in the direction parallel to the axis. The annular bushing is rotatably mounted on the objective side of the tube housing of said internal sleeve and is provided with a driving pin cooperating at least approximately without clearance with said recess.

It may be of advantage from a manufacturing standpoint to provide both internal sleeves with a helical groove, to be engaged by each of the control elements of the central focusing element and to provide two annular bushings, one on each tube. This will facilitate the setting of the focusing lenses in a mutually aligned initial position. By final mounting, therefore, only one of the annular sleeves needs to be positioned.

Further details may be found in the following description of a preferred embodiment of a binocular telescope schematically represented in the drawing.

The binocular telescope 10 consists essentially of two tubes 11, 12, hingedly interconnected by means of a hollow, double joint bridge 13. The bridge 13 is closed with a cover 14, so that only a knurled knob 16 of a central focusing element 17 protrudes outwardly for focusing, while a spindle 18 is located inside the bridge 13. The spindle is mounted rotatably on the end surfaces 19, 20. The knurled knob 16 is located in a center recess 21 of the double joint bridge 13, whereby a straight line is created between its upper end surface and the upper edge of the upwardly drawn parts 22, 23 of the front surface. The cover 14 is also recessed, so that the knurled knob 16 protrudes slightly beyond the external surface of the cover 14 and is readily manipulated.

A cross stirrup 24 resiliently, i.e., tensionally engages with the spindle 18, wherein a threaded segment 25, interrupted in its center, serves as the means to engage the spindle 18. This insures a tilt-free construction. The rotation of the spindle 18 displaces the cross stirrup 24 upwardly or downwardly (in the plane of the drawing). Its ends engage two control elements 26, 27, which are equipped with annular recesses 28, 29 for driving purposes. The cross stirrup 24 is resiliently formed and is pretensioned, in order to insure the transfer of motion without play. By means of the contact of the cross stirrup 24 and its spring action, potential manufacturing tolerances of the double joint bridge 13 and of the transfer elements may be absorbed.

The rod shaped control elements 26, 27 are mounted respectively in the bores 30, 31, with axes 32, 33, of the double joint bridge 13 in an axially displaceable manner. It should be understood that the mounting arrangements to be described hereinbelow for the control elements are identical in the two tubes 11, 12. The axes 32, 33 of the bores 30, 31 are coincidental with those of the double joint bridge 13, which have mountings formed again identically for the left and the right tube, on the ocular side by a ball 34 with bearing sockets 35, 36 and on the objective side by ring 37 with bearing shoulders 38, 39.

The control element penetrates the ring 37. It is bent at a right angle in its lower part and continues through an orifice 40 into a protruding, lower joint support 41. The orifice 40 is designed—at least in the vicinity of the tube—as a guide 49 for the control element 26, so that, while the latter remains axially displaceable, it cannot, however, be rotated. The bearing socket 35 and the bearing shoulder 38 are located within the double joint bridge 13, while the bearing socket 36 and the bearing shoulder 37 are arranged in the lower joint support 41 and in an upper joint support 42.

With its bent, horizontal end, the control element 26 engages a helical groove 43 of a sleeve 44 axially displaceable in the tube 11 and carrying a focusing lens 45. The sleeve 44 has a limited recess 46 extending in a direction parallel to the axis. A driving pin 47 engages approximately without play the recess 46, and the driving pin is provided on the inner side of an annular bushing 48 rotatably mounted on the tube 11.

The mode of functioning of the focusing device is as follows: for the central focusing adjustment, the knurled knob 16 of the central focusing element 17 is actuated, which thereby rotates the spindle 18. By means of the threading of the spindle, movement is transferred to the cross stirrup 24 which abuts with its threaded segment 25 under tension against the spindle 18. Because the ends of the cross stirrup 24 engage the annular recesses 28, 29 of the control elements 26, 27, the latter are moved along within the bores 30, 31. This movement is transferred to the sleeves 44 and hence to the focusing lenses 45.

For diopter focusing for the equalization of visual resolutions of the user, the annular bushing 48 surrounding the objective system is rotated. It is conventionally provided with fluting 50 or knurling. In the process, the driving pin 47 engaging the recess 46 of the sleeve 44 rotates the latter. Because this sleeve has a curved groove 43, cooperating with the horizontal end of the control element 26, during the rotation of the annular sleeve 48 an axial displacement of the sleeve 44, and thus of the focusing lens 45, simultaneously takes place.

What is claimed is:

1. A binocular telescope with internal focusing, comprising:
    two telescope tubes, each having an ocular end and an objective end;
    an ocular lens axially fixed within the ocular end of each of said telescope tubes;
    an objective lens axially fixed within the objective end of each of said telescope tubes;
    a double joint bridge connecting said two telescope tubes;
    a central focusing element rotatably connected to said bridge;
    means, located in at least a first of said telescope tubes and including a first focusing lens axially movable within said first tube between said ocular and objective lenses, for internally focusing said telescope;
    means for transforming rotational movement of said central focusing element into axial adjustment of said focusing lens; and
    means, including an annular bushing rotatably mounted near the objective end of said first telescope tube on the outside surface of and coaxially with said first tube, for independently varying the axial position of said first focusing lens, in order to make diopter focusing adjustments.

2. A binocular telescope according to claim 1, wherein said internal focusing means includes a first sleeve axially movable inside of said first telescope tube for holding said first focusing lens.

3. A binocular telescope according to claim 2, wherein said movement transforming means comprises a threaded spindle rotatable with said central focusing element, a stirrup member having a threaded portion resiliently biased against said threaded spindle and at least a first arm, and a first axially movable control element engaged by said first stirrup arm and operatively engaging said first sleeve.

4. A binocular telescope according to claim 3, wherein said first sleeve includes a helical groove in the outer surface thereof and wherein said control element engages said first sleeve in said groove, and wherein said first sleeve further includes a recess extending in a direction parallel to the axis of said first telescope tube and said annular bushing includes a pin member on its inner surface engaging in said recess, whereby rotation of said bushing causes rotation of said first sleeve to independently vary the axial position of said first focusing lens.

5. A binocular telescope according to claim 3, wherein said stirrup comprises a second arm and the second telescope tube comprises a second sleeve for holding a second focusing axially movable lens, and a second axially movable control element interconnected and engaged by said second stirrup arm.

6. A binocular telescope with internal focusing, comprising:
two telescope tubes, each having an ocular end and an objective end;
a double joint bridge connecting said two telescope tubes;
a central focusing element rotatably connected to said bridge;
means, located in at least a first of said telescope tubes and including a first focusing lens and a first sleeve axially movable inside of said first telescope tube for holding said first focusing lens, for internally focusing said telescope;
means for transforming rotational movement of said central focusing element into axial adjustment of said focusing lens, said movement transforming means comprising a threaded spindle rotatable with said central focusing element, a stirrup member having a threaded portion resiliently biased against said threaded spindle and at least a first arm, and a first axially movable control element engaged by said first stirrup arm and operatively engaging said first sleeve; and
means, including an annular bushing rotatably mounted near the objective end of said first telescope tube, for independently varying the axial position of said first focusing lens, in order to make diopter focusing adjustments,
wherein said first sleeve includes a helical groove in the outer surface thereof and wherein said control element engages said first sleeve in said groove, and wherein said first sleeve further includes a recess extending in a direction parallel to the axis of said first telescope tube and said annular bushing includes a pin member on its inner surface engaging in said recess, whereby rotation of said bushing causes rotation of said first sleeve to independently vary the axial position of said first focusing lens.

7. A binocular telescope with internal focusing, comprising:
two telescope tubes, each having an ocular end and an objective end;
a double joint bridge connecting said two telescope tubes;
a central focusing element rotatably connected to said bridge;
means, located in at least a first of said telescope tubes and including a first focusing lens and a first sleeve axially movable inside of said first telescope tube for holding said first focusing lens, for internally focusing said telescope;
means for transforming rotational movement of said central focusing element into axial adjustment of said focusing lens, said movement transforming means comprising a first control element axially movable in response to rotation of said central focusing element and operatively engaging said first sleeve; and
means, including an annular bushing rotatably mounted near the objective end of said first telescope tube, for independently varying the axial position of said first focusing lens, in order to make diopter focusing adjustments,
wherein said first sleeve includes a helical groove in the outer surface thereof and wherein said control element engages said first sleeve in said groove, and wherein said first sleeve further includes a recess extending in a direction parallel to the axis of said first telescope tube and said annular bushing includes a pin member on its inner surface engaging in said recess, whereby rotation of said bushing causes rotation of said first sleeve to independently vary the axial position of said first focusing lens.

8. A binocular telescope according to claim 7, wherein said movement transforming means further comprises a threaded spindle rotatable with said central focusing element, a stirrup member having a threaded portion resiliently biased against said threaded spindle and at least a first arm which engages said first control element.

9. A binocular telescope according to claim 8, wherein said stirrup comprises a second arm and the second telescope tube comprises a second sleeve for holding a second focusing axially movable lens, and a second axially movable control element interconnected and engaged by said second stirrup arm.

* * * * *